United States Patent [19]

Krumbiegel et al.

[11] 3,711,421
[45] Jan. 16, 1973

[54] LIQUID SCINTILLATION MIXTURES CONTAINING PERDEUTERIZED SOLVENT AND/OR SOLUBILITY INCREASING AGENT

[75] Inventors: Peter Krumbiegel, Leipzig; Heinz Schmidt, Berlin, both of Germany

[73] Assignee: Deutsche Akademie Der Wissenschaften Zu Berlin, Berlin-Adlershof, Germany

[22] Filed: July 17, 1970

[21] Appl. No.: 55,992

[52] U.S. Cl. ............... 252/408, 23/230 R, 23/253 R, 250/71, 250/83, 252/301.2, 252/363.5
[51] Int. Cl. ............................. G01t 1/20, G09k 1/02
[58] Field of Search ............... 252/408, 301.2, 363.5; 23/230 R, 253 R; 250/71, 83

[56] References Cited

UNITED STATES PATENTS

| | | | |
|---|---|---|---|
| 2,985,593 | 5/1961 | Broderick | 252/408 X |
| 3,010,908 | 11/1961 | Broderick | 252/408 X |
| 3,068,178 | 12/1962 | Kallmann | 252/408 X |
| 3,150,101 | 9/1964 | Heimbuch | 252/408 X |
| 3,170,884 | 2/1965 | Macklin | 252/408 X |
| 3,444,089 | 5/1969 | Carter | 252/408 X |
| 3,444,094 | 5/1969 | Krasovitsky | 252/408 X |
| 3,506,828 | 4/1970 | Hansen | 252/408 X |

*Primary Examiner*—John T. Goolkasian
*Assistant Examiner*—M. E. McCamish
*Attorney*—Michael S. Striker

[57] ABSTRACT

Liquid scintillation mixtures comprising at least one scintillatable organic material in toluene or a solvent structurally related to toluene such as α-methylnaphthaline, ditolylmethane and xylene and which can contain as a solubility increasing agent a quaternary ammonium base, alcohol and/or water wherein at least one of the solvent and/or solubility increasing agent is in a perdeuterized form, and wherein said solvent is used in a form where it is at least 97 atom percent perdeuterized and said solubility increasing agent is used in a form wherein the OH groups thereof are at least 97 atom percent perdeuterized.

10 Claims, No Drawings

LIQUID SCINTILLATION MIXTURES CONTAINING PERDEUTERIZED SOLVENT AND/OR SOLUBILITY INCREASING AGENT

This invention relates to liquid scintillation mixtures comprising solutions of at least one scintillatable substance in an organic solvent which if necessary can contain a solubilizing agent such as a quaternary ammonium base, methanol and/or water.

Liquid scintillators for measuring nuclear rays are known in great numbers. They consist of solutions of phenyloxadiazoles as scintillatable material and a wavelength shifter such as 1,4-di-[2-(5-phenyl-oxazolyl)]-benzene(POPOP) in toluene or a toluene related organic hydrocarbon. For increasing the solubility of the samples to be analyzed which are only soluble with difficulty or else not soluble at all in organic solvents, quaternary ammonium bases, generally in the form of their solutions in toluene or methanol, or alcohol or water are added thereto.

The bases, alcohol and water strongly depress the quantum yield of the scintillation produced by the nuclear rays.

The quantum yield of the liquid scintillators is above all decreased when a large part of the ray energy is lost in the solvent as dissociation energy.

As a measure of the quenching effect in the scintillation mixture, the half value concentration $c_{0.5}$ of the quencher is introduced. At this concentration, the counting rate $Z_0$ is reduced by the factor 2: $Z_{c_{0.5}} = Z_0/2$.

The invention has as its object to provide means for increasing the measuring effectiveness in the detection of low energy Beta-particles through liquid scintillation counting and to provide for an essential lowering of the quenching effect by the use of radioactive materials which are soluble in water, alcohol or other solvents.

Another object of the invention is to provide liquid scintillation mixtures with different ingredients which will increase the effectiveness of the scintillation and which will, as much as is possible, bring about a decreased quenching.

The aforesaid and other objects are attained in accordance with the invention by means of a liquid scintillation mixture of toluene or a toluene related substance such as α-methylnaphthaline, ditolylmethane, xylene or the like or mixtures of some of them and which as solubility increasing agent can contain a quaternary ammonium base, alcohol or water, wherein at least one of all of the components are in the form of perdeuterized compounds. In the case of the bases and alcohols, there may be used compounds which are perdeuterized only in their OH groups.

For detecting an increase in the measuring effectiveness $^3$H-benzoic acid samples are dissolved in the known manner and also in the scintillation mixtures of the invention.

The advantage of the invention lies in that the $^3$H-measuring effectiveness of the liquid scintillation mixtures of the invention is greater by a factor of 1.3–6 than that of the conventional undeuterized mixtures. The sensitivity of the measuring of weak nuclear rays can be increased in this manner by the aforesaid factors.

The following Examples are given in order to more fully illustrate the invention and are in no wise to be construed as limitative of the scope thereof.

EXAMPLE 1

10 ml of a liquid scintillator, which consists of a solution of 5 g/l 2-phenyl-5-(4-biphenyl)-oxadiazole(PBD) and 0.1 g/l POPOP in perdeuterized toluene were treated with 0.1 ml of a $^3$H-benzoic acid solution (5 mg/ml) in perdeuterized toluene and then subjected to a measuring procedure in a liquid scintillation spectrometer. The effectiveness of this scintillator (measured in terms of count rate) lies about 90 percent higher than that of a scintillator $^3$H-benzoic acid solution which is different from the former solution in that instead of perdeuterized toluene, normal but otherwise similar pure toluene is used.

EXAMPLE 2

1 ml of the solution prepared according to Example 1 showed a 70 percent higher count rate for the perdeuterized toluene.

EXAMPLE 3

By the addition of 6 vol.% of water to the scintillation solution according to Example 2, the decrease of the tritium count rate amounts to only 8 percent in the case of perdeuterized toluene solution as compared to 45 percent in the case of the use of a conventional toluene solution; with perdeuterized water in the case of perdeuterized toluene solution 15 percent and in the case of conventional toluene solution to 30 percent.

EXAMPLE 4

By addition of methanol or methanol which is perdeuterized in the OH group to the scintillator solutions according to Example 2, the following half-value concentrations of the quencher were measured:

| | $c_{0.5}$ |
|---|---|
| CH$_3$OH in C$_7$H$_8$ scintillator | 0.70 ml |
| CH$_3$OD in C$_7$H$_8$ scintillator | 0.84 ml |
| CH$_3$OH in C$_7$D$_8$ scintillator | 1.23 ml |
| CH$_3$OD in C$_7$D$_8$ scintillator | 1.52 ml |

Similar effects were measured with ethanol instead of methanol.

EXAMPLE 5

By the addition of the quaternary base hyamine hydroxide (Trade Mark Röhm and Haas)* or similar quaternary ammonium bases like diluene or soluene) perdeuterized in the OH group, to a scintillator solution according to Example 2, the following half-value concentrations of the quencher were determined:

| | $c_{0.5}$ |
|---|---|
| hyamine H in C$_7$H$_8$ scintillator | 0.27 ml |
| hyamine D in C$_7$H$_8$ scintillator | 0.30 ml |
| hyamine H in C$_7$D$_8$ scintillator | 0.36 ml |
| hyamine D in C$_7$D$_8$ scintillator | 0.41 ml |

EXAMPLE 6

By the addition of 80 vol.% original hyamine hydroxide 10× (Röhm & Haas) to scintillator solutions according to Example 2, the half-value concentration in the case of normal toluene is $c_{0.5} = 0.12$ ml and in the case of perdeuterized toluene. $c_{0.5} = 0.33$ ml original hyamine hydroxide.

EXAMPLE 7

1 ml of a liquid scintillator consisting of a solution of 5 g/l PBD and 0.1 g/l POPOP in perdeuterized α-methylnapthaline showed a scintillation yield which was 70 percent higher than the same solution prepared in similarly pure α-methylnaphthaline but which is not perdeuterized.

EXAMPLE 8

A scintillation mixture according to Example 2, which additionally contains 6 weight percent perdeuterized water, 80 weight percent methanol-OD and 10 weight percent quaternary ammonium base OD showed a count rate higher by a factor of 6 than a mixture of the corresponding but not deuterized substances.

EXAMPLE 9

1 ml of the solution prepared according to Example 1, but which contains perdeuterized p-xylene instead of perdeuterized toluene, and p-xylene instead of toluene showed a 60% higher counting rate for the perdeuterized p-xylene.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appendage:

1. Liquid scintillation mixtures comprising at least one scintillatable organic material in toluene or a solvent structurally related to toluene and which can contain as a solubility increasing agent a quaternary ammonium base, alcohol or water wherein at least one of the solvent and solubility increasing agent is in a perdeuterized form.

2. Liquid scintillation mixture according to claim 1 wherein said solvent is in a form where it is at least 97 atom percent perdeuterized and said solubility increasing agent is in a form wherein the OH groups thereof are at least 97 atom percent perdeuterized.

3. Liquid scintillation agent according to claim 1 wherein said solvent is a member selected from the group consisting of toluene, α-methylnaphthaline, ditolylmethane and xylene.

4. Liquid scintillation agent according to claim 1 containing a mixture of two or more perdeuterized solvents.

5. Liquid scintillation agent according to claim 1 wherein said solvent is perdeuterized toluene.

6. Liquid scintillation agent according to claim 5 additionally containing perdeuterized water.

7. Liquid scintillation agent according to claim 5 additionally containing perdeuterized methanol.

8. Liquid scintillation agent according to claim 5 additionally containing perdeuterized hyaminehydroxide, diluene or soluene.

9. Liquid scintillation agent according to claim 5 additionally containing perdeuterized water, perdeuterized methanol and a perdeuterized quaternary ammonium base.

10. Liquid scintillation agent according to claim 1 wherein said solvent is perdeuterized α-methylnaphthaline.

* * * * *